United States Patent
Khan et al.

(10) Patent No.: US 8,495,159 B2
(45) Date of Patent: *Jul. 23, 2013

(54) CACHING EMAIL UNIQUE IDENTIFIERS

(75) Inventors: Taimoor Khan, Believue, WA (US);
James David Huntley, Sammamish, WA (US); David James Clarke, Redmond, WA (US)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/620,350

(22) Filed: Sep. 14, 2012

(65) Prior Publication Data
US 2013/0018976 A1 Jan. 17, 2013

Related U.S. Application Data

(63) Continuation of application No. 12/709,007, filed on Feb. 19, 2010, now Pat. No. 8,326,932.

(60) Provisional application No. 61/154,291, filed on Feb. 20, 2009.

(51) Int. Cl.
G06F 15/16 (2006.01)

(52) U.S. Cl.
USPC .......................... 709/206; 709/203; 709/217

(58) Field of Classification Search
USPC ................. 709/203, 206, 207, 217, 223, 230, 709/248
See application file for complete search history.

(56) References Cited

U.S. PATENT DOCUMENTS

| | | | |
|---|---|---|---|
| 6,779,019 B1 | 8/2004 | Mousseau et al. | |
| 7,228,383 B2* | 6/2007 | Friedman et al. | 709/217 |
| 7,805,489 B2 | 9/2010 | Roberts | |
| 8,023,934 B2* | 9/2011 | Jeide et al. | 709/248 |
| 8,065,363 B2 | 11/2011 | Roberts | |

(Continued)

FOREIGN PATENT DOCUMENTS

| | | |
|---|---|---|
| WO | 2007/040504 A1 | 4/2007 |
| WO | 2007040501 A1 | 4/2007 |
| WO | 2007040503 A1 | 4/2007 |
| WO | 2007040504 A1 | 4/2007 |

OTHER PUBLICATIONS

E-mail access via mobile phone- issued date Aug. 22-24, 2005. IEEE Xplore-email access via mobile phone p. 1.

(Continued)

*Primary Examiner* — Ramy M Osman
(74) *Attorney, Agent, or Firm* — Novak Druce Connolly Bove + Quigg LLP

(57) ABSTRACT

Accessing, via an end user device, email messages of an external mail source. A direct access proxy is operative to reconcile the email contents of external email sources with the email contents of user devices through the use of lists of unique email identifiers (UIDs). A Partition Database returns UID lists reflective of the UIDs of email messages previously received from the external email source and forwarded to a network server of the system (forwarded UID lists). A memory cache external to the direct access proxy and its corresponding Partition Database returns forwarded UID lists. The direct access proxy determines the data reliability of the Partition Database and memory cache, and obtains forwarded UID lists from the memory cache when it determines that the memory cache is at least as reliable as the Partition Database.

21 Claims, 9 Drawing Sheets

U.S. PATENT DOCUMENTS

| | | | |
|---|---|---|---|
| 8,275,841 B2* | 9/2012 | Heinla et al. | 709/225 |
| 2003/0088629 A1 | 5/2003 | Berkowitz et al. | |
| 2006/0031352 A1* | 2/2006 | Marston et al. | 709/206 |
| 2007/0073813 A1 | 3/2007 | Kamat et al. | |
| 2007/0073814 A1 | 3/2007 | Kamat et al. | |
| 2007/0073815 A1* | 3/2007 | Kamat et al. | 709/206 |
| 2008/0082409 A1* | 4/2008 | Huynh | 705/14 |
| 2008/0256203 A1 | 10/2008 | Gorty et al. | |
| 2009/0083385 A1 | 3/2009 | Heredia et al. | |
| 2009/0247134 A1* | 10/2009 | Jeide et al. | 455/414.2 |
| 2009/0327433 A1* | 12/2009 | Comertoglu et al. | 709/206 |

OTHER PUBLICATIONS

Suhayya Abu-HakimaA Common Multi-Agent Testbed for diverse seamless personal information networking applications. IEEE communications magazine—Jul. 1998, pp. 1-7.

Jing Xie—A Novel Enterprise Mobile e-mail system using the syncML protocol. issued date—May 14-16, 2008, pp. 391-396.

Extended European Search report mailed Jun. 11, 2010, in corresponding European patent application No. 10154179.5.

Office Action mailed Nov. 14, 2012, in corresponding Canadian patent application No. 2,693,724.

* cited by examiner

CACHING EMAIL UNIQUE IDENTIFIERS

CROSS REFERENCE TO RELATED APPLICATIONS

This application is a continuation of U.S. patent application Ser. No. 12/709,007, ("the '007 application") filed on Feb. 19, 2010 and entitled "Caching Email Unique Identifiers." The '007 application claims the benefit of U.S. Provisional Patent Application Ser. No. 61/154,291, filed Feb. 20, 2009 and entitled "Caching Email Unique Identifiers." All of these disclosures are incorporated herein by reference.

FIELD

The present technology relates to the field of communications systems, and, more particularly, to electronic mail (email) communications systems and related methods.

BACKGROUND

Electronic mail (email) has become an integral part of business and personal communications. As such, many users have multiple email accounts for work and home use. Moreover, with the increased availability of mobile cellular and wireless local area network (LAN) devices that can send and receive emails, many users wirelessly access emails from mailboxes stored on different email storage servers (e.g., corporate email storage server, Yahoo, Hotmail, AOL, etc.).

Yet, email distribution and synchronization across multiple mailboxes and over wireless networks can be quite challenging, particularly when this is done on a large scale for numerous users. For example, different email accounts may be configured differently and with non-uniform access criteria. Moreover, as emails are received at the wireless communications device, copies of the emails may still be present in the original mailboxes, which can make it difficult for users to keep their email organized.

One "push" type email distribution and synchronization system is disclosed in U.S. Pat. No. 6,779,019 to Mousseau et al., which is hereby incorporated herein by reference. This system pushes user-selected data items from a host system to a user's mobile data communication device upon detecting the occurrence of one or more user-defined event triggers. The user may then move (or file) the data items to a particular folder within a folder hierarchy stored in the mobile data communication device, or may execute some other system operation on the data item. Software operating at the mobile device and the host system then synchronizes the folder hierarchy of the mobile device with a folder hierarchy of the host system, and any actions executed on the data items at the mobile device are then automatically replicated on the same data items stored at the host system, thus eliminating the need for the user to manually replicate actions at the host system that have been executed at the mobile data communication device.

A direct access email distribution and synchronization system is described in U.S. Patent Application Publication No. US 2008/0256203, incorporated herein by reference in its entirety. That system includes a network engine that communicates with the plurality of a user subscribed mobile wireless communications devices via a communications network for sending and receiving emails. A direct access server is operative with the network engine for polling electronic mailboxes of users from an email source and retrieving electronic messages from the electronic mailboxes and pushing any electronic mailboxes to the network engine to selected users subscribed mobile wireless communications devices. The direct access server communicates with an email source using, inter alia, the internet message access protocol (IMAP) and IMAP-Idle supportable connections to accept real-time notifications such that when a connection limit is reached or exceeded to an email source, the direct access server disables IMAP-Idle connections to the email source.

The foregoing systems provide convenience to users of wireless email communication devices for organizing and managing their email messages. Yet, further convenience and efficiency features may be desired in email distribution and synchronization systems as email usage continues to grow in popularity.

SUMMARY OF THE DISCLOSURE

In various example embodiments, the technology includes systems, computer program products, and processor-implemented electronic mail processing methods. The technology stores, in a database assigned to a direct access proxy, a list of electronic mail message unique identifiers (UIDs) identifying a plurality of messages. The messages are associated with a device. The device is assigned to the direct access proxy. The technology then stores the list in a cache. Upon receiving, in the direct access proxy, a request directed to UIDs of the device, the technology determines if the database is unavailable. If the database is unavailable, and if the device has not been assigned to a subsequent direct access proxy, the technology responds to the request using the cache. The request can be a query, an add UID, delete UID, etc. In some example embodiments, the cache executes external to the direct access proxy. In some example embodiments, the cache executes external to the partition database. In some example embodiments, the cache executes as a serialized cache. In some example embodiments, the cache executes on the same hardware platform as the direct access proxy, and the cache executes as a process separate from the direct access proxy. In some example embodiments, after responding to the query using the cache, the technology determines that the database is available, and updates the database from the cache.

DETAILED DESCRIPTION

Reference will now be made in detail to example embodiments of the technology. Each example is provided by way of explanation of the technology only, not as a limitation of the technology. It will be apparent to those skilled in the art that various modifications and variations can be made in the present technology without departing from the scope or spirit of the technology. For instance, features described as part of one embodiment can be used on another embodiment to yield a still further embodiment. Thus, it is intended that the present technology cover such modifications and variations that come within the scope of the technology.

The present technology includes a system and method of accessing, via an end user device, email messages of an external mail source. A direct access proxy is operative to reconcile the email contents of external email sources with the email contents of user devices through the use of lists of unique email identifiers (UIDs). A Partition Database returns UID lists reflective of the UIDs of email messages previously received from the external email source and forwarded to a network server of the system (forwarded UID lists). In some example embodiments, a memory cache external to the direct access proxy and its corresponding Partition Database returns forwarded UID lists. The direct access proxy determines the data reliability of the Partition Database and memory cache, and obtains forwarded UID lists from the memory cache when it determines that the memory cache is at least as reliable as the Partition Database.

Figure 1:
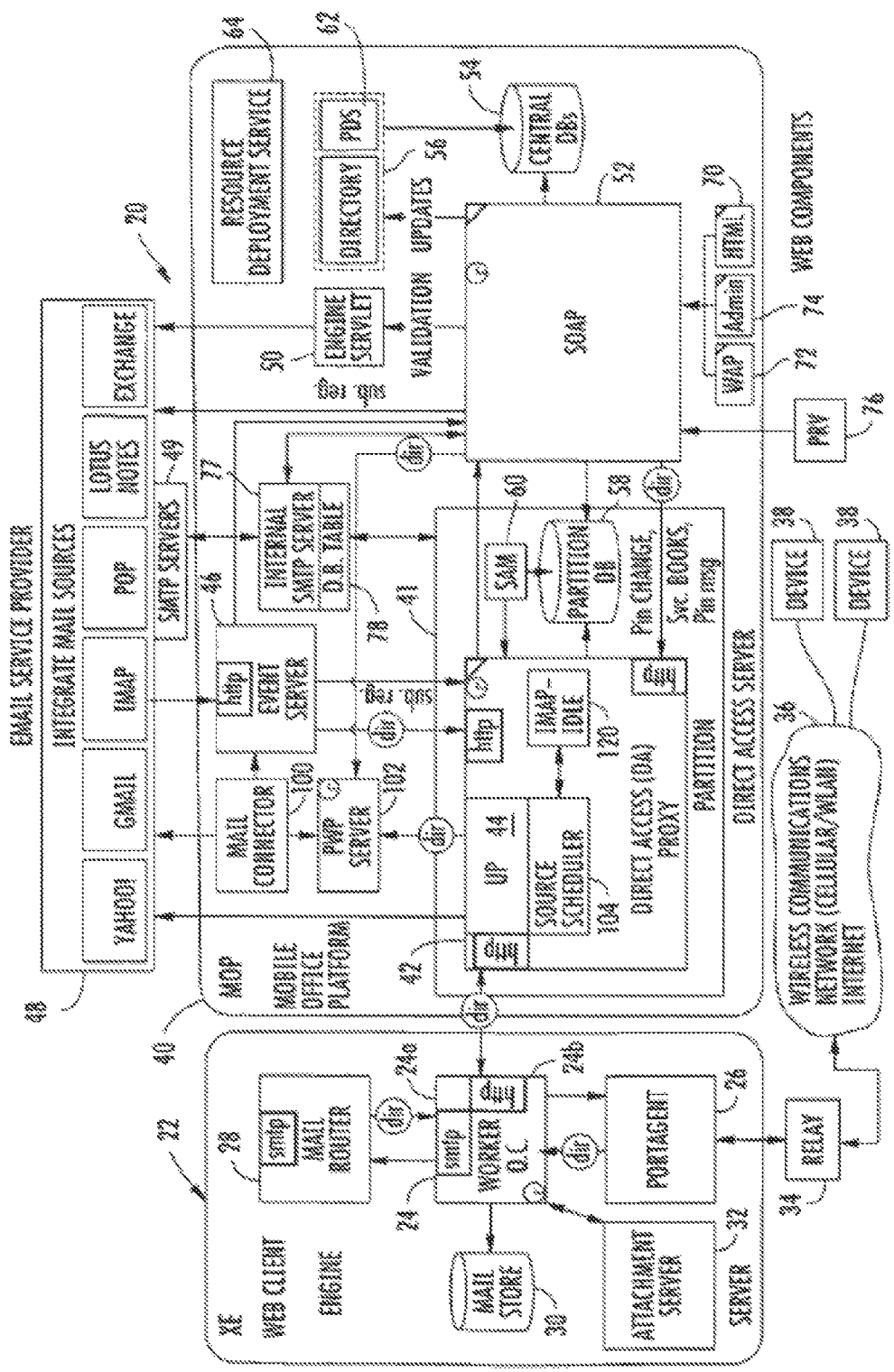
FIG. 1 is a schematic block diagram of a direct access electronic mail (email) distribution and synchronization system.

Components of a Direct Access email system 20 are shown in FIG. 1. The web client or network engine 22 has various components. The worker 24 is a processing agent that is responsible for most processing in the engine 22 and includes SMTP 24a and HTTP 24b server support. It determines out-of-coverage information. It accepts email from the DA Proxy 42 and external mail routers, formats email in compressed multipurpose Internet mail extension CMIME, and sends it to the port agent 26 and other components. The port agent 26 acts as a transport layer between the email system infrastructure and the rest of the engine 22. The mail router 28 is an MTA (Mail Transfer Agent) and is responsible for relaying messages into the mail store 30, which are destined for hosted subscribers. It is also responsible for accepting and relaying email notifications. The mail store 30 is a MIME message store that resides on a central storage system to provide support for "more," "forward," "reply," and attachment viewing features. The attachment server 32 provides service for documents and attachment conversion requests from workers.

The symbol "dir" that is attached to a line illustrates that a directory lookup has been made to determine the service instance to call, for example, which the DA Proxy 42 can retrieve an email for a particular pin and service book. The symbol "r" attached to a component illustrates that it registers itself with a directory of the PWP Directory Service (PDS) 62. The triangular attachment on the WAP and HTML components illustrates that it is a client of a Resource Deployment Service.

The Relay 34 with the Wireless Communications Network 36, such as a cellular network or WLAN and cooperates with a Port Agent 26 using a Global Unique Identifier (GUID) for each message. The Network 36 communicates with one or more wireless communications devices 38, such as portable wireless communications devices.

The mobile office platform 40 interfaces between email service providers 48 and the engine 22. A DA Proxy (DA) 42 of the mobile office platform 40 includes service through which integrated mail source 48 messages are delivered to or retrieved from by the worker 24. A DA polls sources such as mailboxes, processing source notifications and retrieval and update of source messages via the universal proxy 44. The universal proxy (UP) 44 abstracts access to disparate mail stores into a common protocol, e.g., WebDAV. The event server 46 is a lightweight process on a server that receives notifications from external sources and different user mailboxes and processes them asynchronously without blocking the sender of notifications. The integrated mail sources 48 as email service providers include non-limiting examples such as Yahoo!, Gmail, IMAP-compatible services, POP-compatible services, Lotus Notes, and Exchange. The engine servlet 50 is a high performance service on the server capable of validating a large number of integrated sources concurrently. This engine 50 is used in a source integration process to validate the access settings to a mailbox. The SOAP-compatible business logic 52 is a primary interface to query, update and modify data in the central and Partition Databases 54, 58 respectively. It also implements business logic that triggers other workflows in the system (e.g., send, delete service books). The central database 54 stores system-wide data related to sites and carriers, mailbox providers (AOL, Yahoo), service books, devices and user accounts. The Partition Database 58 is a primary data store for users with regard to data used in integrating external mail services. It stores data for a fixed set of users. The directory 56 is a system responsible for assigning, locating and distributing users and their associated workloads across service instances, e.g., service instances of a DA. The source assignment manager (SAM) 60 assigns sources to the DA Proxy 42 for the purposes of mail detection (polling, subscribing, etc.). The PDS (PWP directory service) 62 is a registry of PWP servers and is responsible for load balancing mail connector (MC) 100 clients across PWP server instances. Any PWP server 102 and mail connector 100 components are used together to access mailboxes when the system is unable to directly access an external mail source (e.g., source is behind corporate firewall). The Resource Deployment System (RDS) 64 allows the dynamic deployment of new brand and language specific resources.

There are also various UI and web components. The HTML proxy 70 provides an HTML user interface for users to manage their account. The WAP proxy 72 provides a WML and XHTML user interface for users to manage their account. The WEB ADMIN and ADMIN 74 proxy provides an HTML user interface for carriers to perform administrative functions on their customer accounts. A desktop client is deployed via a device CD, and allows the user to integrate sources with a native Win32 UI. A device client allows the user to integrate sources using a java based UI on the device. Provisioning (PRV) 76 can also occur. Also illustrated is the internal SMTP server 77 operative with a database table 78 and associated with the MOP 40. A source scheduler 104 and IMAP-Idle connection module (manager) 120 are shown.

A Partition Database 58 contains data related to a user account and integrated sources such as: integrated source configuration data alert rules, signature and similar items. The Partition Database also contains some global data replicated from the central database 54 to keep the central database 54 load to a minimum, e.g., service books. The bulk of the data in the Partition Database 58 is in the tracking of message Unique Identifiers (UIDs) for each integrated source. This table is potentially updated each time a source is polled. The Partition Database 58 is accessed via SOAP 52 and the DA Proxy 42. The Partition Database 58 is the main scaling mechanism of the data store. It handles a fixed number of users. As the number of users increases more partitions can be added allowing the system to scale out.

In order to ensure that sources are being serviced, a Polling Manager (a portion of the DA Proxy 42) at configured intervals queries the Partition Database 58 to retrieve all sources which may be new or changed based on a timestamp returned by the last query. The new timestamp can be used in the next query. The source list is compared with the query results to determine which sources either have been changed, deleted, or inserted. For inserted sources the Directory is called to retrieve the DA Proxy assignment. A message is sent to all the DA proxies that have changes or additions to one or more sources they are servicing.

The DA Proxy 42 is the conduit for sending and receiving emails between the engine 22 and the integrated mail sources 48. Additionally, the DA Proxy is responsible for detecting new mail from external mail sources and pushing to the engine 22. Three mechanisms of detection are used for polling, subscription to mailbox for notifications, and permanent connections to sources. It also provides the engine with access to User data. It processes message from the device, e.g., message from handheld (MFH) messages, for integrated sources (new mail, reply, forward, delete). It also pushes service books to the engine 22.

Figure 8:
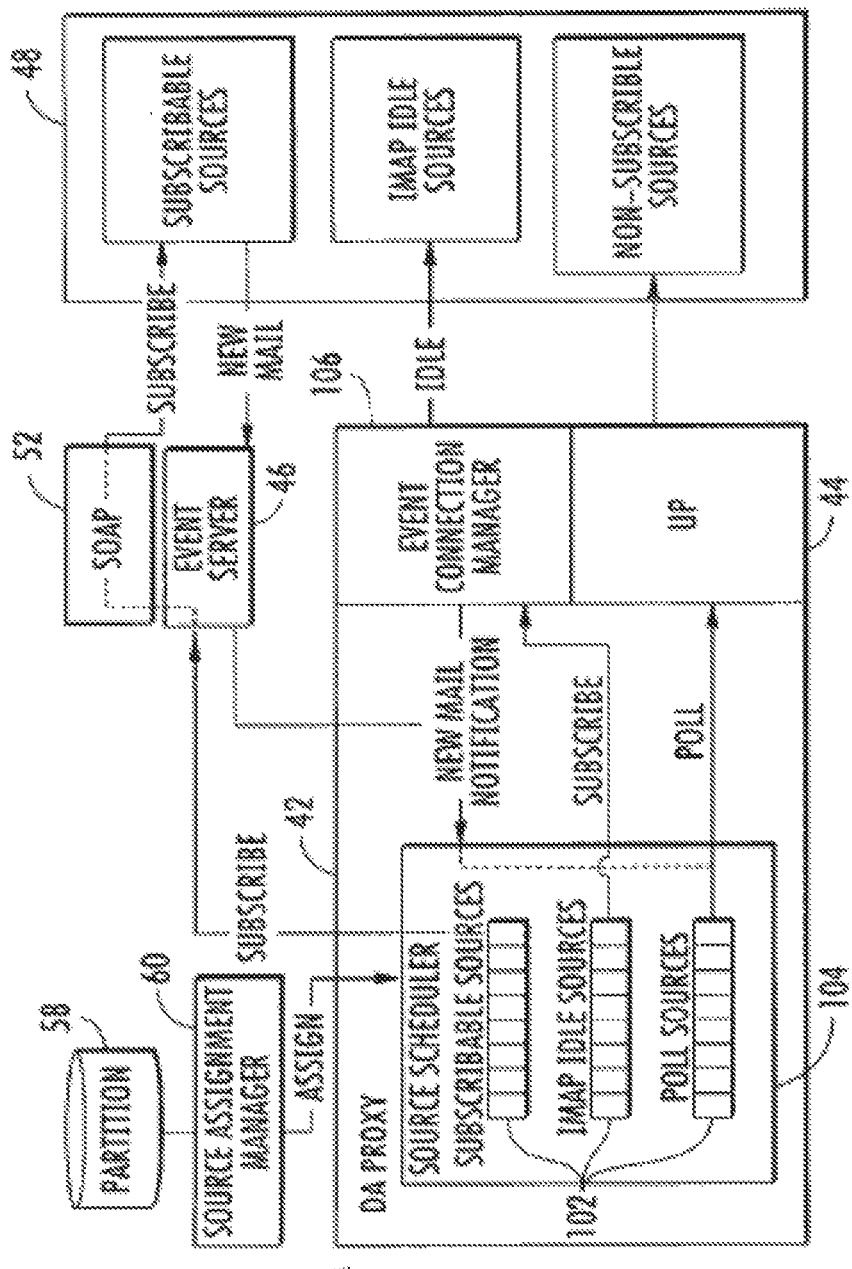
FIG. 8 is a block diagram showing components that interoperate with the Direct Access Proxy shown in the direct access e-mail system of FIG. 1

The DA Proxy 42 is responsible for actively detecting changes to the sources assigned to it by the Source Assignment Manager 60. The DA Proxy maintains a set of sources that it schedules for servicing. Every source has some level of polling. Less polling is done for those sources that support subscribing or a connection based notification. FIG. 8 illustrates at a high level the components of mail detection, including a source scheduler 104 for scheduling different sources, and also an event connection manager 106 as part of the DA Proxy 42 and the IMAP-Idle sources.

Polling of sources can be scheduled at even intervals (usually 15 minutes). Sometimes a source poll is expedited if heuristics determines that it is likely to find new mail. There are at least three types of polls. The IgnoreOldPoll works as a poll that retrieves all messages IDs from the source and writes them to the Partition Database 58.

The full poll retrieves all message IDs from a source mailbox to do a full reconciliation against all message IDs (UIDs) that previous polls have found. For each new UID found, the message is retrieved and sent to the Engine 22 for delivery to the device 38. For UIDs not found (e.g., deleted from the source) the UID is removed from the Partition Database 58. New UIDs are also written to the Partition Database 58. The DA Proxy 42 executes a full poll on a source when it has been more (e.g., more time, more messages) than the value stored in database since the last full poll, or when a quick poll has been disabled for this source.

The Quick poll retrieves only a "page" of source message IDs at a time. It stops once it finds a UID it has already seen. At this point it assumes it has found all new messages. The new messages are then retrieved and sent to the Engine 22 for delivery to the device. New UIDs are now written to the Partition Database 58.

Each DA Proxy 42 relies on the nonvolatile storage of its associated Partition Database 58 for storing and retrieving lists of email Unique IDs (UIDs). A UID list identifies, among other things, those email messages that were forwarded to end user devices 38. UID lists retrieved from a Partition Database 58 are compared to the UID list acquired e.g., via polling, subscription, or IMAP Idle connection, from an external source to determine changes. In direct access email distribution and synchronization technology, like the technology disclosed in U.S. Patent Application Publication 2008/0256203 (incorporated herein by reference in its entirety) the bulk of the Partition Database 58 requests made by a DA Proxy 42 are for UID lists. Any Partition Database 58 downtime would mean that email may not be delivered to sources since the source UIDs can not be retrieved and resolved by the DA Proxy 42. Partition Database 58 unavailability can introduce latency in synchronizing the external source(s) 48 and the end user device 38, or worse, persistent inconsistency between the content of an external email source 48 and the email seen on an end-user device 38. By caching UIDs on the same hardware platform as the DA Proxy 42 servicing these sources 48, e.g., by caching UID lists in memory, the system becomes more resilient to Partition Database 58 downtime and latency in so far as it handles polling of external email sources 48.

In some example embodiments, this feature caches UID lists for mail sources 48 in a cache external to the DA Proxy 42 and the Partition Database 58. In some example embodiments, the cache runs on the same hardware platform as the DA Proxy using it. Once a list of UIDs has been received from a source 48, e.g., the source has been polled, the UID list is placed in the external cache for subsequent lookups. The external cache is updated in case the UID list is updated in the database. This alleviates some of the load from the database since the cache is used for subsequent lookups as described herein. The "external" nature of the cache is in part a consequence of design features of the direct access solution described herein. Other cache implementations are possible under the present technology, but in each the basic features are similar.

Calls by a DA Proxy 42 to its Partition Database 58 to determine the most recent UID list are one of the most frequent calls which are made to the database. The system obtains UID lists from sources to determine if there are any new messages which need to be delivered to the subscriber. The bulk of requests made by a DA Proxy 42 on a Partition Database 58 are requests for UID lists. Database downtime affects the delivery of new mail since the DA Proxy 42 can not perform UIDL resolution to determine if there is any new email for the polled sources without having the UID list from its Partition Database. Caching UID lists helps the system determine if there are new emails which need to be sent to the subscriber. By caching UID lists outside of the Partition Database 58, the number of subscribers that were unaffected by the database downtime (since those subscribers did not receive any new mail since the last time mail was delivered to them) can be determined This lightens the load on the Partition Database 58 as the DA Proxy 42 only retrieves UID lists that are not in the cache. This also helps in better utilization of existing hardware.

This enhancement reduces the load on the Partition Database 58 by caching UID lists outside of the database. This is accomplished by utilizing an external cache. In the event that the Partition Database 58 is unavailable, subscribers unaffected due to the database outage can be determined.

Saving UID lists to a cache (e.g., memcached) helps with overall system availability since it reduces dependency on the backend database for source message UID polling requests. In some example embodiments, there is a one-to-one relation between a DA Proxy 42 and its cache, and the external cache is resident on the same box on which its DA Proxy 42 resides. This provides the benefit of not fetching the data over the wire from the Partition Database 58, which will improve efficiency as well. This technology increases memory requirements on the machines running the DA Proxy and the cache.

This feature adds an abstraction layer, in some example embodiments inside the DA Proxy, for retrieving UIDs in addition to the external cache. The abstraction layer fetches the data from the external cache if it is available there, otherwise it fetches the data from database and populate the external cache with the data for future use.

Caching UID lists improves reliability and robustness of the system as it reduces the dependency on the Partition Database 58 for polling UID lists. In case the database is unavailable, the DA Proxy 42 could, via the UID List abstraction layer, learn the UID lists from the cache and perform UIDL resolution. Its primary purpose is to reduce the load on the database servers. Secondly it can allow email delivery or it may suspend it if the database is unavailable.

In some example embodiments when UID lists are added to or deleted from the Partition Database 58, but for some reason the UID abstraction layer is unable to update the external cache, it marks the source as "dirty". In some example embodiments this happens in the abstraction layer. The next time the abstraction layer receives an "add," "delete," or "refresh" request for this source, it checks to see whether the source is dirty or not. If it finds the source to be dirty, then it fulfills an add or delete request from database only and does not rely on the external cache's data. If a data refresh request is made and the source is found to be dirty, an attempt is made to update the external cache after the UIDs have been fetched from the database. The UID list is then processed in the cache as usual and the source is unmarked as dirty. If the source is found not to be dirty upon checking after a request is received, then for add and delete operations, the operation is first performed on the partition database 58; then the cache is updated for that source.

In some example embodiments there is an external cache watch dog thread that checks for the availability of the external cache. Before any external cache operation is performed, cache availability is queried from the watch dog. If the watch dog reports the external cache is unavailable, then the request is serviced from the database. If the request was for modifying the UID list, the source is marked as dirty within DA Proxy 42. The source is synchronized with the database on the next polling request. In some example embodiments, the watch dog is a service within the DA Proxy 42 and separate from the UID caching store (which is the abstraction layer).

In some example embodiments, if the DA Proxy 42 goes down for some reason, in some example embodiments, it flushes the cache on start-up. This approach guards against the scenario where the directory had issued a rebalance and the external cache contains stale data. For example, if the PIN 'X' for a mailbox is being serviced by DA Proxy 'A' and DA Proxy 'A' happens to go down (though its external cache lives on), the directory rebalances the PIN and assign it to another DA Proxy, e.g., DA Proxy 'B'. DA Proxy 'B' continues to service PIN 'X' until DA Proxy 'A' is back online, however, now a UID list for sources for this PIN in two external caches and moreover the external cache for DA Proxy 'A' probably contains stale data. Therefore, on start-up, DA Proxy A flushes its external cache and reloads it on an as needed basis from the Partition Database. The entry in the external cache for DA Proxy B is removed once the source is dropped from its source scheduler. In other example embodiments, the DA Proxy 42 trusts the cache, but then updates it as soon as possible from the Partition Database. In still other example embodiments the DA Proxy trusts the cache and updates the Partition Database from the cache.

Memcached (pronounced: mem-cache-dee) is a third party caching server that can be used to implement the present technology. The current binary version of Memcached has a limitation of being able to store, at most, values of only 1 mega-byte (MB) per key entry. Table 1 provides empirical data on the number and percentage of sources having UID lists exceeding 1 MB in size. This can be an issue for large mail boxes where the size of the UID list may be more than this limit. On average a mail source has five hundred messages and the UID has an average number of thirty bytes. The external cache also can store the last message id. This message ID is typically an integer (4-bytes). This makes the average size of bytes to store for a source to be approximately 20 kilo-byte (KB). This number in is further reduced in implementation as this data is compressed before storing it in the external cache.

If despite compression, a mail source consumes more than 1 MB of UID list it is not stored to the external cache and the source is flagged as such, e.g, in the abstraction layer. This helps prevent subsequent unnecessary processing of this source just to find out again that the UID list for this source is larger than 1 MB after compression. Periodically such a flagged source is processed again, e.g., after a time period or number of requests to see if the UID for the source now fits the limit of less than 1 MB. If so, such a source UID list is processed on subsequent requests.

TABLE 1

| Region | Total number of sources (includes both hosted and integrated) | Number of sources exceeding the 1 MB limit | Percentage of sources greater than 1 MB limit |
| --- | --- | --- | --- |
| NA | 90600 | 69 | 0.08% |
| EU | 88864 | 68 | 0.08% |
| AP | 75000 | 81 | 0.11% |

In some example embodiments, the cache is run in a separate process on the same boxes running the DA Proxies 42. Memory is required to run a cache on the same box as a DA Proxy 42. Also there is an added serialization and de-serialization cost as the data are retrieved from memcached and is used to populate the further in-memory cache.

The communication between the DA Proxy 42 and the external cache can be synchronous. However, there can be a watchdog thread that checks for cache availability (checking interval based on a configurable property). In such example embodiments, the DA Proxy 42 threads checks with this watchdog to find out the availability status of the external cache.

If two DA Proxies 42 are run on the same server then two external caches can be run on the same server as well. The servers will require more memory to handle the increased load.

In some example embodiments, the DA Proxy 42 stores a copy of the entire UID list for a given source in the external cache. There is an increased penalty in memory due to cost of serialization when the UID list is modified for this source. When a UID list is modified in the partition database, the DA Proxy 42 fetches the UID list of this source from the external cache. This list is then updated to reflect the changed list in the database and subsequently stored back in the external cache. If a source has a large UID list, the system uses more memory to serialize and de-serialize this request. The effect of this added cost of serialization and de-serialization on the garbage collector can be measured under load conditions.

In some example embodiments, the abstraction layer is used to access the database directly to execute the stored procedures to obtain the list of UIDs for a given source. A data abstraction layer is put in place so abstraction layer performance is not determined by whether the UID list is being obtained from Memcached or from the Database itself.

Figure 3:
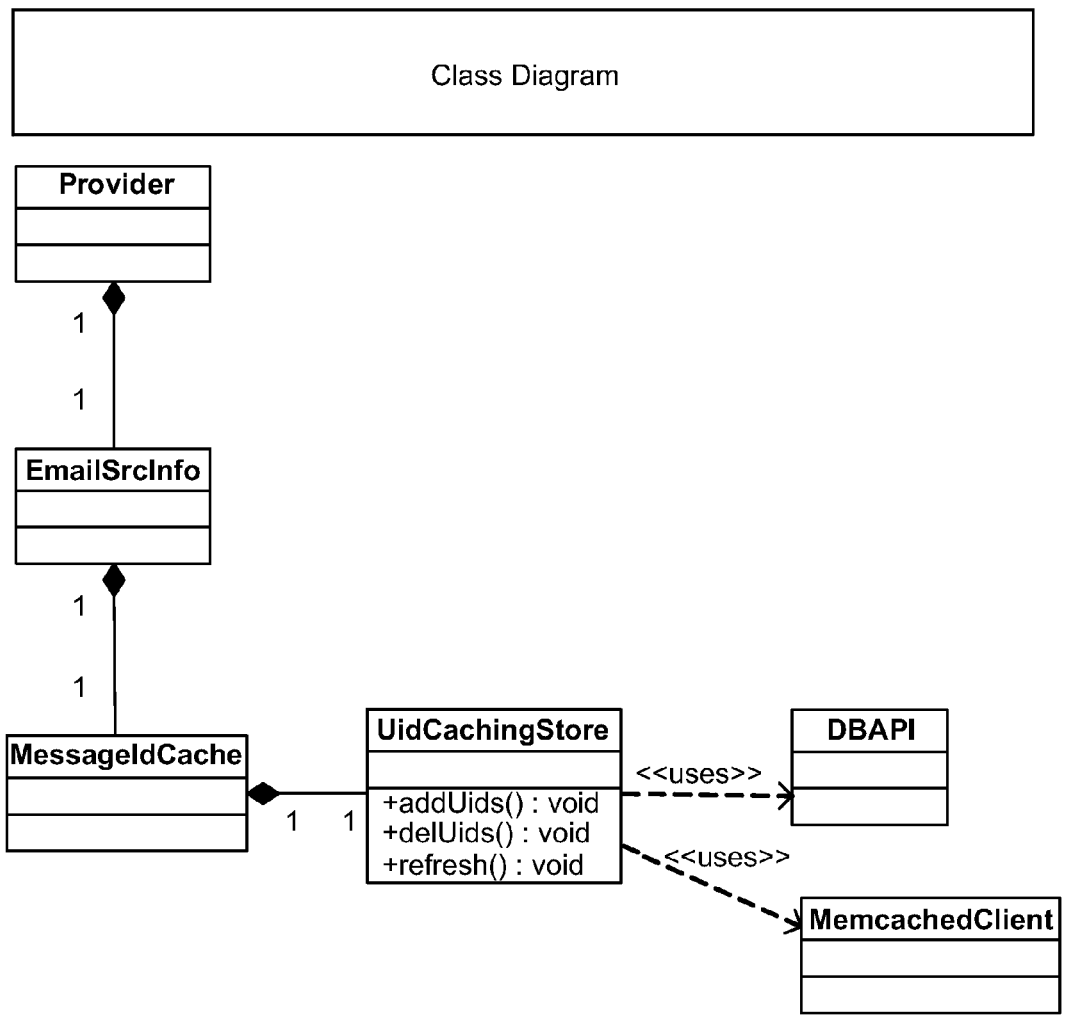
FIG. 3 is a class diagram of an abstraction layer of the technology.

Referring to FIG. 3, the MessageIdCache uses a new abstraction (UIDCachingStore) to access UID data. The UIDCachingStore gets the UID list from memcached if available, otherwise it obtains the data from the database and then stores it in memcached for future use. When UIDs are either added or deleted, the operation is first performed in the database and if successful, the UID list is retrieved from memcached and the UIDs are added or deleted from this list. The updated list is stored back in memcached. In case of UID list turnover, the UID list is deleted from database and the entry is also deleted from memcached.

Figure 4:
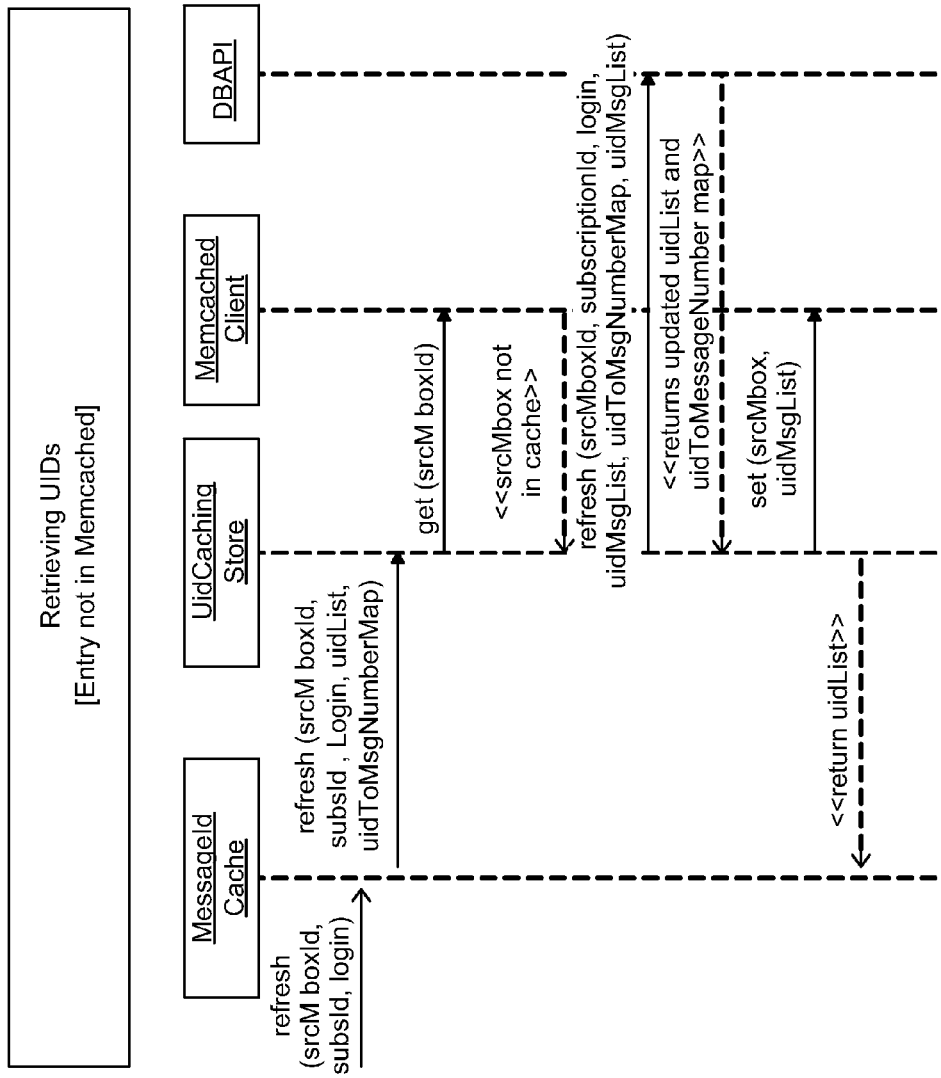
FIG. 4 illustrates procedures for processing UIDs.
Figure 5:
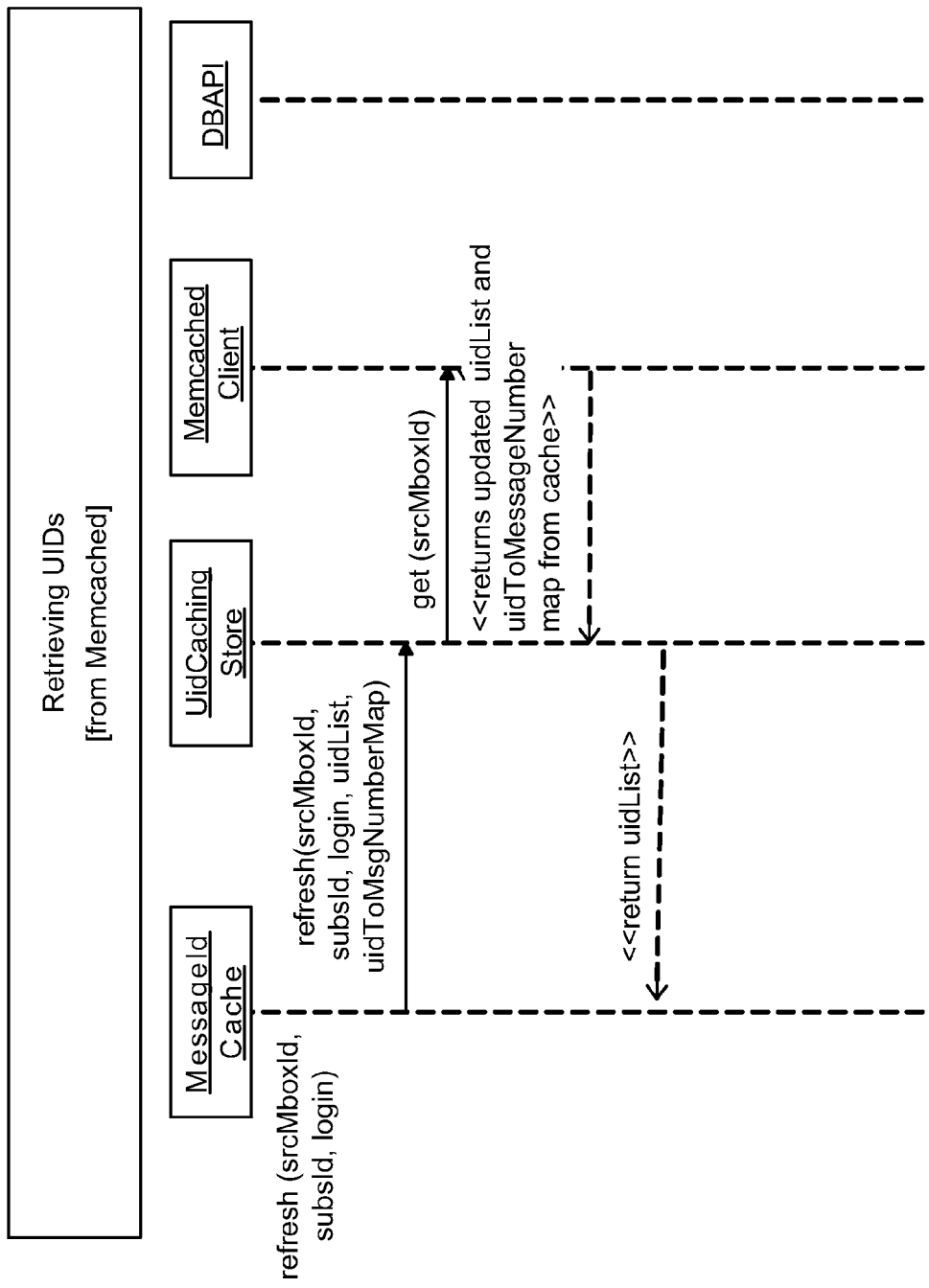
FIG. 5 illustrates procedures for processing UIDs.

Referring to FIG. 4 and FIG. 5, when a poll request is made on the UIDLResolutionHandler it refreshes the messageIdCache for the source. The messageId cache in turn makes a request to UIDCachingStore to get the list of UIDs for this source. The UIDCachingStore checks if the UIDs are available in the cache. If they are not in the cache then the UIDCachingStore makes a refresh request on the DBAPI to fetch the UIDs from the database. Upon retrieving the list, UIDCachingStore adds the list to the cache for future use. The next time a polling request is made for this source, the data is retrieved from the external cache, avoiding the database hit.

Figure 6:
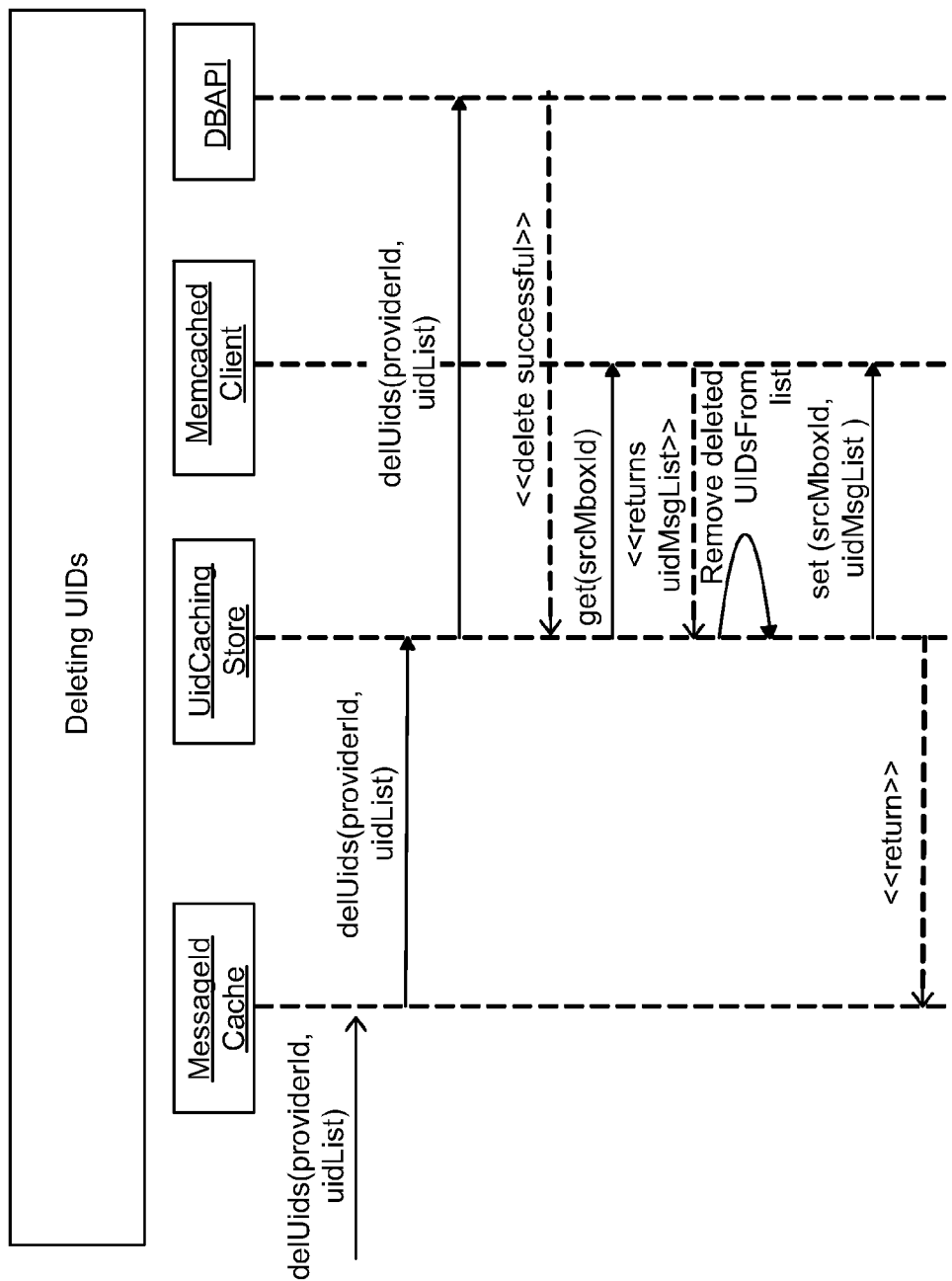
FIG. 6 illustrates procedures for processing UIDs.
Figure 7:
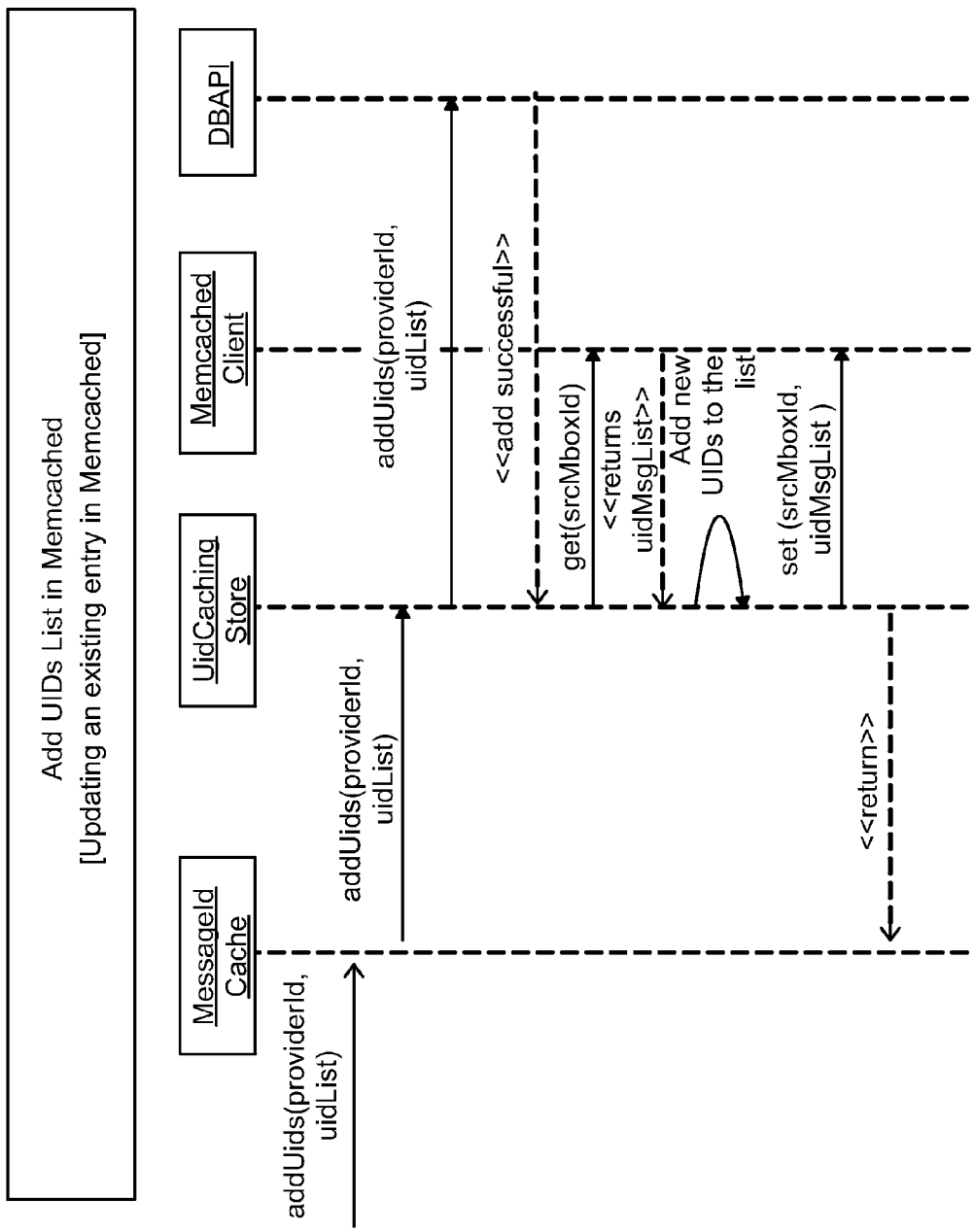
FIG. 7 illustrates procedures for processing UIDs.

Referring to FIG. 6 and FIG. 7, when UIDs are either deleted or added to a source, the MessageIdCache forwards the request to the UIDCachingStore, which first deletes or adds the UIDS from the database and then updates the cache accordingly.

Figure 9:
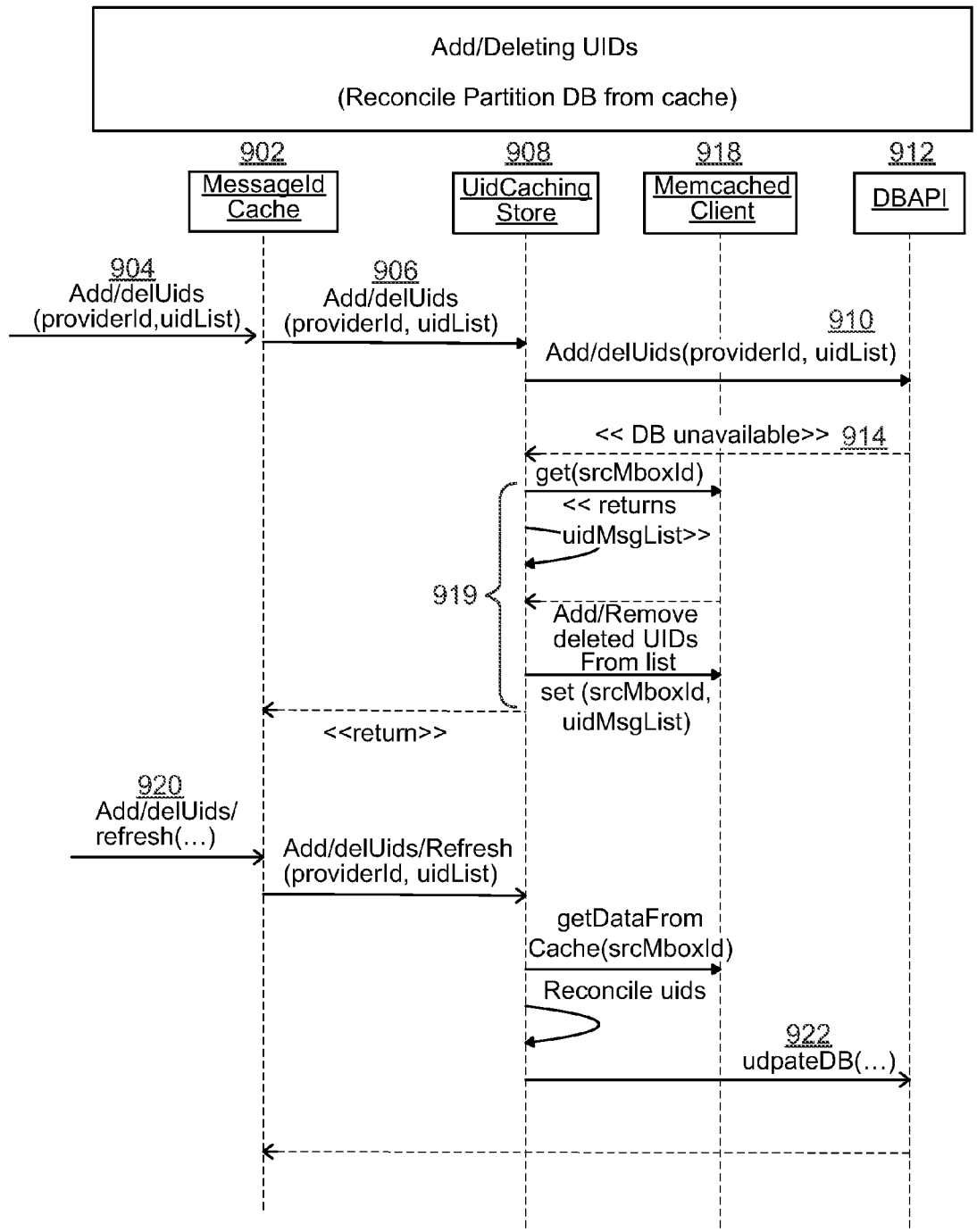
FIG. 9 illustrates methods of the technology.

Referring to FIG. 9, the MessageIdCache 902 receives a request to modify a UID list 904, the MessageIdCache 902 forwards the request 906 to the UIDCachingStore 908. The UIDCachingStore 908 request to make the modification to the UID lists 910 stored in the partition database (DBAPI) 912. Where the partition database is unavailable 914 (shown as a response in FIG. 9, but also determined in other fashions, e.g., non-response after a timeout period), the UIDCachingStore 908 will request that the UIDs be updated 916 in the cache 918 (shown as a MemcachedClient). Upon the next add/delete or refresh request 920, MessageIdCache will update 922 the partition database 912 with the data from cache 908.

Memcached cache component does not require any new platform recommendation. It is run on the same boxes which are running the DA Proxy processes. On a 64-bit Linux machine, memached needs to be linked to the appropriate shared library. A sample command to do this is: ln -s/uselocal/lib/libevent-1.3e.so.1/lib64/.

When a polling request is received by a DA Proxy 42, e.g., from within DA, or from notification received via subscription or IMAP Idle, it updates its UID and Message IDs from the database. When external caching is used, this data is serialized and stored in the external cache. The data in the external cache is only resident in memory and does not require serialization to disk. This increases the memory requirements of the boxes running the DA component. The cache can be in either volatile or non-volatile memory, e.g., RAM, flash, a hard drive.

The data are stored as a ConcurrentHashMap of UID and messageID key value pairs. This structure is preferred over an array list since it makes it simpler to remove entries without compacting the array list after each removal; though any data-structure may be used which can associate the UIDs and MessageIDs together.

The properties in Table 2 are sample configuration properties added to the DAproxy.properties file for using memcached as an external cache.

TABLE 2

| Property | Description | Allowed values | Default value |
| --- | --- | --- | --- |
| teamon.proxy.weDAv.DA.memcached.enabled | Turns the memcached feature on and off. Note: this does not start-up or shutdown any processes! | true, false | true |
| teamon.proxy.weDAv.DA.memcached.server | Specifies the IP and port of the memcached server. | <IP>:<PORT> | localhost: 1121 |
| teamon.proxy.weDAv.DA.memcached.-client.large_src_retry_after | Specifies the number of poll requests after a large source is rechecked for size after a delete uids call has been made. | Any reasonable number greater than 1. | 5 poll requests |
| teamon.proxy.weDAv.DA.memcached.-client.failure_timeout | Specifies the time in milliseconds for which a client waits for a response from memcached. | Any reasonable valid number greater than zero. | 1000 (ms) |
| teamon.proxy.weDAv.DA.memcached.-client.watchdog_interval | Specifies the time interval in milliseconds for the watchdog thread. This is the interval which is used by the watchdog thread to check the availability of the external cache | Any reasonable number greater than zero. | 5000 (ms) |
| teamon.proxy.weDAv.DA.memcached.-client.pool_size | Specifies the size of memcached client object pool. The thirdparty client library uses this number to initialize its pool. | Any reasonable number greater than zero. | 25 memcached client objects |

Tables 3-10 list sample monitoring points and are applicable to any external cache. Memcached is used as one such implementation of the external cache the data types for system monitoring management and operations.

TABLE 3

| Name | totalNumberOfCacheHits |
|---|---|
| Description | The total number of cache hits (where a value was returned from cache). |
| Identifier | Tbd |
| Statistic Method | Cumulative, Reset on startup |
| Data Type | Long |
| Aggregation Method | Cumulative |
| Expected Value | n/a (depends on load) |
| Minimum Value | 0 == no requests |
| Maximum Value | Tbd |
| Magic Number | n/a |

TABLE 4

| Name | totalNumberOfCacheMisses |
|---|---|
| Description | The total number of cache misses (where a value was not returned from cache). |
| Identifier | 1000:4096:2 |
| Statistic Method | Cumulative, Reset on startup |
| Data Type | Long |
| Aggregation Method | Cumulative |
| Expected Value | n/a (depends on load) |
| Minimum Value | 0 == no requests |
| Maximum Value | Tbd |
| Magic Number | n/a |

TABLE 5

| Name | totalNumberOfCacheSets |
|---|---|
| Description | The total number of store operations performed on the cache. |
| Identifier | 1000:4096:2 |
| Statistic Method | Cumulative, Reset on startup |
| Data Type | Long |
| Aggregation Method | Cumulative |
| Expected Value | n/a (depends on load) |
| Minimum Value | 0 == no requests |
| Maximum Value | Tbd |
| Magic Number | n/a |

TABLE 6

| Name | totalNumberOfDroppedConnections |
|---|---|
| Description | The is the total number of dropped or broken connections from the client to memcached server. |
| Identifier | 1000:4096:3 |
| Statistic Method | Cumulative, Reset on startup |
| Data Type | Long |
| Aggregation Method | Cumulative |
| Expected Value | n/a (depends on load) |
| Minimum Value | 0 == no drops |
| Maximum Value | Tbd |
| Magic Number | n/a |

TABLE 7

| Name | totalTimeForSetOperations |
|---|---|
| Description | The is total time spent on store operations on memcached. |

TABLE 7-continued

| Name | totalTimeForSetOperations |
|---|---|
| Identifier | 1000:4096:4 |
| Statistic Method | Cumulative, Reset on startup |
| Data Type | Long |
| Aggregation Method | Cumulative |
| Expected Value | n/a (depends on load) |
| Minimum Value | 0 == no set operations. |
| Maximum Value | Tbd |
| Magic Number | n/a |

TABLE 8

| Name | totalTimeForGetOperations |
|---|---|
| Description | The is total time spent on retrieve operations on memcached. |
| Identifier | 1000:4096:5 |
| Statistic Method | Cumulative, Reset on startup |
| Data Type | Long |
| Aggregation Method | Cumulative |
| Expected Value | n/a (depends on load) |
| Minimum Value | 0 == no get operations |
| Maximum Value | Tbd |
| Magic Number | n/a |

TABLE 9

| Name | Available |
|---|---|
| Description | The metric indicates if memcached is available or unavailable. |
| Identifier | 1000:4096:6 |
| Statistic Method | Non-Cumulative, Reset on startup |
| Data Type | Long |
| Aggregation Method | Newest |
| Expected Value | n/a (depends on load) |
| Minimum Value | 0 == Yes, 1 == No. |
| Maximum Value | 0 == Yes, 1 == No. |
| Magic Number | n/a |

TABLE 10

| Name | memcachedClientPoolSize |
|---|---|
| Description | This is the size of the memcached client pool. |
| Identifier | 1000:4096:7 |
| Statistic Method | Non-Cumulative, Reset on startup |
| Data Type | Long |
| Aggregation Method | Newest |
| Expected Value | n/a (depends on load) |
| Minimum Value | 1 |
| Maximum Value | Less than the number of DA Job threads. |
| Magic Number | n/a |

The external cache feature may be enabled or disabled at any time without having to restart the direct access system There is also another command provided to see which sources are currently marked "dirty" in the DA (i.e., which portions of the cache can be relied on. Another command is provided to see the list of large sources (greater than 1 MB) in the DA as well.

The external cache is run as a separate process on the same box running the DA. The cache should be started before starting the DA to avoid redundant calls to the database. If memcached goes down, it can simply be restarted. Upon restart memcached is empty and is again to fill up as requests for UIDS for different sources come in.

When memcached is up and running but is unavailable to some clients which have just added or deleted UIDS in the database, the procedure described in above regarding caching UID lists is followed to ensure reliability and recovery.

Memcached can be started with many different command line options (use the -h flag to see the list). Following is a simple way to start a memcached instance: "memcached -m 2048-1<IPADDR>-p<PORT>.

An alternative to this approach is to use an in-memory cache of UIDs in the DA Proxy. This approach is affected by garbage collection, which sometimes freezes the DA Proxy for up to a minute, which in turn causes the system to rebalance. Use of more efficient garbage collection could change this conclusion.

In some example embodiments, not having to purge the external cache on DA Proxy start-up can provide additional advantage. This is done in conjunction with the directory, where a directory tells the DA Proxy which sources were rebalanced.

In some example embodiments, in case of database unavailability, the system sends new emails to the subscribers but since the delivery status is not updated in the database, the system can send duplicate emails until the database is available again and the delivery status is up-to-date.

Another alternative is to update the polling code as well, to keep an in-memory list of messages which were sent to the device and whose delivery status are not stored in the database. Once the database is available again, the database is brought up to date from this list.

In some example embodiments, an alternative is to modify the memcached client library to store sources (which consumed larger than 1 MB of data after compression) to split this source over multiple keys. Another alternative is to recompile the external cache with a slab size limit greater than 1 MB.

Some example embodiments have the UID persist from the database. In some, 4 UIDS are run with one DA Proxy. In some, the account could exist on any of the DA Proxies, in some a shared Memcached can be used.

FIGS. 2, 4-7 and 9 are a flowchart and illustrations of procedures according to example embodiment. Some of the steps in the flowchart and procedures illustrated may be performed in an order other than that which is described. Also, it should be appreciated that not all of the steps described in the flowchart and procedures are required to be performed, that additional steps may be added, and that some of the illustrated steps may be substituted with other steps.

Figure 2:
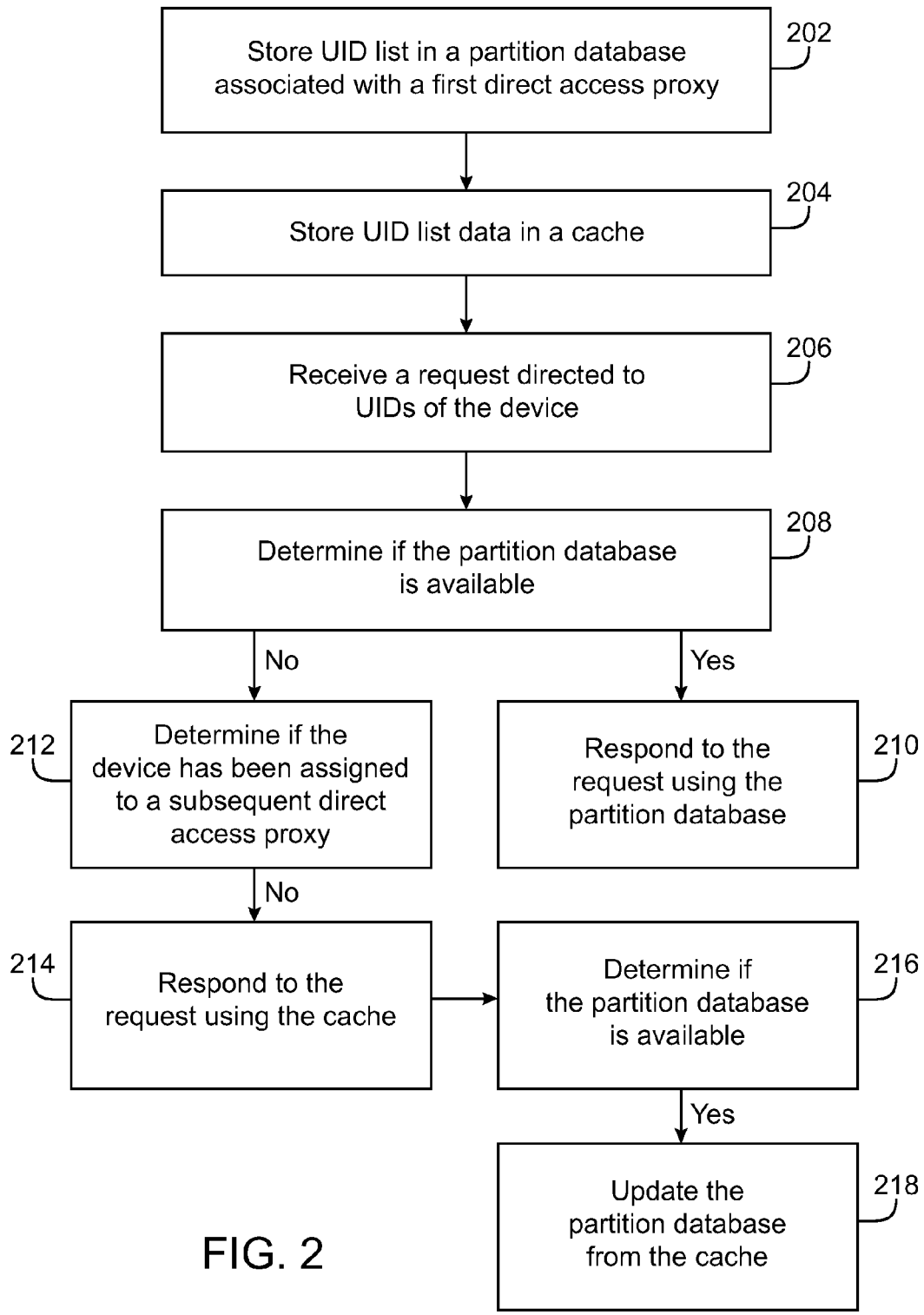
FIG. 2 is a flowchart illustrating operation of a processor-implemented method of the technology.

Referring to FIG. 2, features of a processor-implemented method 200 of the technology are shown. A list of UIDs for messages associated with a device 38 is stored 202 in a database 58 of a partition 41 associated with a DA Proxy 42 to which the device 38 is assigned. The UID list data is then stored 204 in a cache. In some example embodiments, the cache executes external to the partition database 58. This makes the cache less susceptible to failure if the partition database 58 fails. Upon receiving a request 206 directed to UIDs of the device 38, the technology determines if the partition database 58 is available 208. If the partition database is determined to be available, the technology responds 210 to the request using the partition database. If the partition database 58 is determined to be unavailable, the technology determines 212 if the device 38 has been assigned to a subsequent direct access proxy. If the device is determined not to have been assigned to a subsequent direct access proxy, the technology responds 214 to the request using the cache. Subsequently, upon the technology determines if the database 58 becomes available 216, upon which the technology updates 218 the database 58 from the cache. In some example embodiments, the request is a query; in others, the request is an add, delete, or update of the UID list. In some example embodiments, the cache executes external to the DA Proxy 42. In some example embodiments, the cache executes external to the partition database. In some example embodiments, the cache executes as a serialized cache. In some example embodiments, the cache executes on the same hardware platform as the direct access proxy, and the cache executes as a process separate from the direct access proxy.

The technology can take the form of an entirely hardware embodiment, an entirely software embodiment or an embodiment containing both hardware and software elements. In one embodiment, the technology is implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Both processors and program code for implementing each as aspect of the technology can be centralized or distributed (or a combination thereof) as known to those skilled in the art.

A data processing system suitable for storing program code and for executing program code will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. An electronic mail processing system comprising:
a server including a processor and memory, the server configured to:
store, in a database assigned to the server, a list of electronic mail message unique identifiers (UIDs) identifying a plurality of messages associated with a device;
store the list in a cache;
receive a query directed to UIDs of the device;
determine that the database is unavailable due to database downtime; and
respond to the query using the cache.

2. The electronic mail processing system of claim 1, wherein the cache executes external to the server.

3. The electronic mail processing system of claim 1, wherein the cache executes external to the database.

4. The electronic mail processing system of claim 1, wherein the cache executes as a serialized cache.

5. The electronic mail processing system of claim 1, wherein the electronic mail processing module further comprises instructions operative, after responding to the query using the cache to:
   determine that the database is available; and
   update the database from the cache.

6. The electronic mail processing system of claim 1, wherein the cache is a third party server.

7. The electronic mail processing system of claim 1, wherein the cache resides on hardware shared by the server.

8. The electronic mail processing system of claim 1, wherein determine that the database is unavailable due to database downtime further comprises determining that the device has not been assigned to a subsequent server.

9. A non-transitory computer readable medium comprising computer readable instructions that are executable by at least one processor to perform a method comprising:
   storing, in a database assigned to a server, a list of electronic mail message unique identifiers (UIDs) identifying a plurality of messages associated with a device;
   storing the list in a cache;
   receiving a query directed to UIDs of the device;
   determining that the database is unavailable due to database downtime; and
   responding to the query using the cache.

10. The non-transitory computer readable medium of claim 9, wherein the cache executes external to the direct access proxy.

11. The non-transitory computer readable medium of claim 9, wherein the cache executes external to the database.

12. The non-transitory computer readable medium of claim 9, wherein the cache executes as a serialized cache.

13. The non-transitory computer readable medium of claim 9, wherein the electronic mail processing module further comprises instructions operative, after responding to the query using the cache to:
   determine that the database is available; and
   update the database from the cache.

14. The non-transitory computer readable medium of claim 9, wherein the cache is a third party server.

15. The non-transitory computer readable medium of claim 9, wherein the cache resides on hardware shared by the server.

16. The non-transitory computer readable medium of claim 9, wherein determining that the database is unavailable due to database downtime further comprises determining that the device has not been assigned to a subsequent server.

17. A method implemented on a server including a processor and memory, the method comprising:
   storing, in a database assigned to the server, a list of electronic mail message unique identifiers (UIDs) identifying a plurality of messages associated with a device;
   storing the list in a cache, receiving a query directed to UIDs of the device;
   determining that the database is unavailable due to database downtime; and
   responding to the query using the cache.

18. The method of claim 17, wherein after responding to the query using the cache, the method further comprises:
   determining that the database is available; and
   updating the database from the cache.

19. The method of claim 17, wherein determining that the database is unavailable due to database downtime further comprises determining that the device has not been assigned to a subsequent direct access proxy.

20. The method of claim 17, wherein the cache executes external to the direct access proxy.

21. The method of claim 17, wherein the cache executes external to the database.

* * * * *